United States Patent
Lee et al.

(10) Patent No.: US 11,820,867 B2
(45) Date of Patent: Nov. 21, 2023

(54) BENZOXAZINE RESIN AND METHOD FOR MANUFACTURING THE SAME

(71) Applicant: NAN YA PLASTICS CORPORATION, Taipei (TW)

(72) Inventors: Cheng-Chung Lee, New Taipei (TW); Chen-Hua Wu, Taipei (TW); Yu-Shiang Peng, Taipei (TW); Wei-Ting Wei, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 193 days.

(21) Appl. No.: 17/367,603

(22) Filed: Jul. 5, 2021

(65) Prior Publication Data

US 2022/0220258 A1 Jul. 14, 2022

(30) Foreign Application Priority Data

Jan. 13, 2021 (TW) ................... 110101315

(51) Int. Cl.
*C08G 73/02* (2006.01)
*C08L 79/04* (2006.01)

(52) U.S. Cl.
CPC .......... *C08G 73/0233* (2013.01); *C08L 79/04* (2013.01); *C08L 2205/03* (2013.01)

(58) Field of Classification Search
CPC .. C08L 79/04; C08L 79/085; C08L 63/00–10; C08L 2205/03; C08G 4/00; C08G 14/04; C08G 14/06; C08G 73/00; C08G 73/0233; C08G 73/06
See application file for complete search history.

(56) References Cited

U.S. PATENT DOCUMENTS 10,144,824 B2  12/2018  Li et al.

FOREIGN PATENT DOCUMENTS

| | | |
|---|---|---|
| CN | 103562317 A | 2/2014 |
| CN | 109354825 A | 2/2019 |
| CN | 112079978 A | 12/2020 |
| JP | 201272319 A | 4/2012 |
| JP | 2012171971 A | 9/2012 |
| JP | 201720011 A | 1/2017 |
| JP | 2017502100 A | 1/2017 |

*Primary Examiner* — Ana L. Woodward
(74) *Attorney, Agent, or Firm* — Li & Cai Intellectual Property Office

(57) ABSTRACT

A benzoxazine resin and a method for manufacturing the same, and a resin composition are provided. The benzoxazine resin is obtained from a condensation polymerization reaction of a phenolic compound, formaldehyde, and a primary amine compound that are used as a reactant. The phenolic compound includes a dicyclopentadiene phenol resin and bisphenol A. The primary amine compound includes 2,6-dimethylaniline and m-xylylenediamine. The resin composition includes the benzoxazine resin, an epoxy resin, and a bismaleimide resin. Based on a total weight of the benzoxazine resin, the epoxy resin, and the bismaleimide resin being 100 phr, an amount of the benzoxazine resin ranges from 30 phr to 50 phr.

19 Claims, No Drawings

BENZOXAZINE RESIN AND METHOD FOR MANUFACTURING THE SAME

CROSS-REFERENCE TO RELATED PATENT APPLICATION

This application claims the benefit of priority to Taiwan Patent Application No. 110101315, filed on Jan. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a benzoxazine resin and a method for manufacturing the same, and a resin composition, and more particularly to a benzoxazine resin and a method for manufacturing the same, and a resin composition that provide good dielectric properties and heat resistance.

BACKGROUND OF THE DISCLOSURE

Due to the progression of technology, electronic components have developed toward being lighter, thinner, shorter, and smaller. In addition, with the coming of $5^{th}$ generation mobile networks (5G for short), requirements for high-frequency transmission, high-speed signal transmission, and low latency have continuously increased throughout the industry. Therefore, considerable effort have been directed toward developing a substrate material with a high glass transition temperature (Tg), a low dielectric constant, a low dielectric dissipation factor, and a good heat resistance in the related fields, so as to satisfy dielectric properties (low dielectric constant and low dielectric dissipation factor) and heat resistance required by an electronic substrate.

A conventional substrate material can be, for example, a polyphenylene ether resin, a bismaleimide resin, or a cyanate ester resin. The above-mentioned resins, whilst having good dielectric properties, have a higher reactivity, a faster reaction rate, and a gel point that is difficult to determine, thereby resulting in poorer processability.

Benzoxazine resins have good processability. However, due to having poorer dielectric properties, the benzoxazine resins are still not able to be applied to products that have a higher requirement for the dielectric dissipation factor (i.e., being less than 0.004). For example, while a type of benzoxazine resin that has a molecular structure of dicyclopentadiene is disclosed in the conventional technology, the dielectric dissipation factor of a printed circuit board made from such a benzoxazine resin is greater than 0.008, which does not satisfy a requirement for high-frequency printed circuit boards. Therefore, the benzoxazine resins currently on the market still have room for improvement.

SUMMARY OF THE DISCLOSURE

In response to the above-referenced technical inadequacies, the present disclosure provides a benzoxazine resin and a method for manufacturing the same, and a resin composition.

In one aspect, the present disclosure provides a benzoxazine resin. The benzoxazine resin is obtained from a condensation polymerization reaction of a phenolic compound, formaldehyde, and a primary amine compound that are used as a reactant. The phenolic compound includes a dicyclopentadiene phenol resin and bisphenol A, and the primary amine compound includes 2,6-dimethylaniline and m-xylylenediamine.

In another aspect, the present disclosure provides a method for manufacturing a benzoxazine resin, which includes steps as follows: mixing a phenolic compound, formaldehyde, a primary amine compound, and a solvent; and performing a condensation reaction at a temperature ranging from 60° C. to 100° C., so as to obtain the benzoxazine resin. The phenolic compound includes dicyclopentadiene phenol and bisphenol A, and the primary amine compound includes 2,6-dimethylaniline and m-xylylenediamine.

In yet another aspect, the present disclosure provides a resin composition, which includes the benzoxazine resin, an epoxy resin, and a bismaleimide resin. Based on a total weight of the benzoxazine resin, the epoxy resin, and the bismaleimide resin being 100 phr, an amount of the benzoxazine resin ranges from 30 phr to 50 phr.

Therefore, by virtue of "the phenolic compound including a dicyclopentadiene phenol resin and bisphenol A" and "the primary amine compound including 2,6-dimethylaniline and m-xylylenediamine", the benzoxazine resin and the method for manufacturing the same, and the resin composition provided by the present disclosure have good heat resistance and dielectric properties.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Apart from having good dielectric properties and heat resistance, a benzoxazine resin of the present disclosure also has a lower water absorption rate and a better dimensional stability. Accordingly, the benzoxazine resin of the present disclosure not only can solve the problem of poor processability associated with a polyphenylene ether resin, a bismaleimide resin, and a cyanate ester resin, but is also capable of being applied to high-frequency printed circuit boards.

Benzoxazine Resin

The benzoxazine resin of the present disclosure is obtained from a condensation polymerization reaction (a Mannich reaction) of a phenolic compound, formaldehyde, and a primary amine compound that are used as a reactant. In addition, in the present disclosure, a dielectric constant of the benzoxazine resin at 1 GHz ranges from 2.6 to 3.2, and a dielectric dissipation factor of the benzoxazine resin at 1 GHz ranges from 0.015 to 0.021.

A method for manufacturing the benzoxazine resin of the present disclosure includes steps as follows. Firstly, a phenolic compound, a primary amine compound, and a solvent are mixed at a temperature ranging from 60° C. to 100° C., so as to form a raw material compound.

In the raw material compound, a total number of moles of hydroxyl groups in the phenolic compound and a total number of moles of amino groups in the primary amine compound are the same or almost the same. The solvent is selected from the group consisting of: toluene, methyl isobutyl ketone (MIBK), methyl ethyl ketone (MEK), and propylene glycol monomethyl ether (PM). However, the present disclosure is not limited to the above-mentioned examples.

Formaldehyde is then added into the raw material compound, and the condensation polymerization reaction is performed for 1 to 10 hours at a temperature ranging from 60° C. to 100° C., so as to obtain the benzoxazine resin of the present disclosure.

A number of moles of the added formaldehyde is 2 to 2.3 times the total number of moles of hydroxyl groups in the phenolic compound (or the total number of moles of amino groups in the primary amine compound). The formaldehyde can be a formaldehyde solution or polyoxymethylene having a concentration of 30 wt % to 40 wt %. However, a manner in which the formaldehyde is added is not limited to that described above.

In some embodiments, after the formaldehyde is added, the raw material compound undergoes a reaction for 1 to 5 hours at a temperature ranging from 70° C. to 90° C., so as to obtain the benzoxazine resin of the present disclosure.

A weight-average molecular weight of the benzoxazine resin of the present disclosure is measured to be between 750 g/mol and 2750 g/mol by a gel permeation chromatograph (GPC). A calibration of the gel permeation chromatograph is conducted based on polystyrene having a standard molecular weight, while a flow velocity is set to be 1.0 mL/min, and tetrahydrofuran is used as mobile phase. In addition, after being measured by the gel permeation chromatograph, a smallest molecular proportion of the benzoxazine resin ranges from 20% to 40%. The smallest molecular proportion refers to an area percentage of a wave crest that last appears in a pattern of a chromatography result.

When the weight-average molecular weight of the benzoxazine resin is greater than 2750 g/mol, the benzoxazine resin does not easily mix with other resins to form a resin composition, and is difficult to be handled. When the weight-average molecular weight of the benzoxazine resin is less than 750 g/mol, a glass transition temperature of the benzoxazine resin is prone to be low, which easily leads to poor heat resistance.

In an exemplary embodiment, the weight-average molecular weight of the benzoxazine resin ranges from 1000 g/mol to 2500 g/mol, and preferably ranges from 1500 g/mol to 2400 g/mol.

The phenolic compound mentioned above includes at least two types of phenolic compounds, and the phenolic compound can have one or more hydroxyl groups. Preferably, the phenolic compound has one or two hydroxyl groups. Or, an average number of hydroxyl groups in the phenolic compound ranges from 1 to 2.

In the present disclosure, the phenolic compound includes a dicyclopentadiene (DCPD) phenol resin and bisphenol A (BPA). In the phenolic compound, a number of moles of hydroxyl groups in the dicyclopentadiene phenol resin accounts for 18% to 55% of the total number of moles of hydroxyl groups in the phenolic compound. A number of moles of hydroxyl groups in the bisphenol A accounts for 45% to 82% of the total number of moles of hydroxyl groups in the phenolic compound.

Furthermore, an added amount of the dicyclopentadiene phenol resin and the bisphenol A can be adjusted according to property requirements. In an exemplary embodiment, a ratio between the number of moles of hydroxyl groups in the dicyclopentadiene phenol resin and the number of moles of hydroxyl groups in the bisphenol A ranges from 0.22 to 1.22.

The primary amine compound mentioned above includes at least two types of amine compounds, and the primary amine compound can have one or more amino groups. Preferably, the primary amine compound has one or two amino groups.

In the present disclosure, the primary amine compound includes 2,6-dimethylaniline and m-xylylenediamine. In the primary amine compound, a number of moles of amino groups in the 2,6-dimethylaniline accounts for 50% to 90% of the total number of moles of amino groups in the primary amine compound. A number of moles of amino groups in the m-xylylenediamine accounts for 10% to 50% of the total number of moles of amino groups in the primary amine compound.

Furthermore, an added amount of the 2,6-dimethylaniline and the m-xylylenediamine can be adjusted according to property requirements. In an exemplary embodiment, the added amount of the 2,6-dimethylaniline is greater than or equal to that of the m-xylylenediamine Specifically, a ratio between the number of moles of amino groups in the 2,6-dimethylaniline and the number of moles of amino groups in the m-xylylenediamine ranges from 1 to 9.

According to the method mentioned above, the benzoxazine resin of the present disclosure can be expressed by the following Formula (I).

Formula (I)

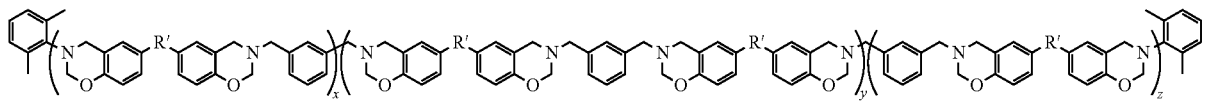

In Formula (I), an average value of x ranges from 0 to less than 5, an average value of y ranges from 0 to less than 5, and an average value of z ranges from 0 to less than 5. In addition, at least one of x and y is not 0, and at least one of y and z is not 0. In an exemplary embodiment, x, y, and z are all greater than 0.

In Formula (I), $R^1$ is

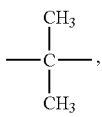

R2 is

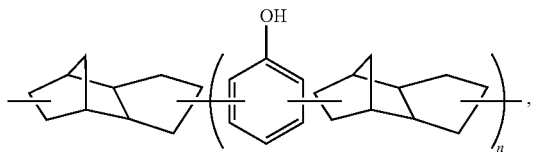

and n is an integer ranging from 0 to 5.

As can be seen from a structure of Formula (I), structurally, the dicyclopentadiene phenol resin has low polarity, which decreases the dielectric constant and the dielectric dissipation factor of the benzoxazine resin. In addition, structurally, the 2,6-dimethylaniline has high symmetry and a low molecular dipole moment, which further decreases the dielectric constant and the dielectric dissipation factor of the benzoxazine resin. In this way, the benzoxazine resin of the present disclosure satisfies market requirements for the high-frequency printed circuit boards.

For better understanding of the present disclosure, reference can be made to descriptions of Synthesis Example 1 and Synthesis Example 2 below.

Synthesis Example 1

A temperature controller, a heating mantle, an electric mixer, and a condenser are placed on a 1 liter four-necked glass reactor. 76.5 grams of the dicyclopentadiene phenol resin (including 0.45 moles of hydroxyl groups), 63 grams of the bisphenol A (including 0.55 moles of hydroxyl groups), 31.6 grams of the m-xylylenediamine (including 0.45 moles of amino groups), 66 grams of the 2,6-dimethylaniline (including 0.55 moles of amino groups), and 460 grams of the toluene (the solvent) are added into the four-necked glass reactor. The four-necked glass reactor is then heated to a temperature ranging from 60° C. to 100° C., so as to dissolve the reactant.

Next, 67 grams (2.1 moles) of the polyoxymethylene is added into the four-necked glass reactor, and the condensation polymerization reaction is carried out for 1 to 5 hours at a temperature ranging from 60° C. to 100° C. After the reaction is completed, the temperature is to be maintained within a range from 60° C. to 100° C. for 4 to 10 hours. Then, the temperature is raised to be within a range from 105° C. to 115° C., so as remove water produced from the reaction and a part of the solvent. In this way, the benzoxazine resin having a solid content of 64 wt % to 66 wt % can be obtained.

The weight-average molecular weight of the benzoxazine resin is measured to be 1724 g/mol by the gel permeation chromatograph, and the smallest molecular proportion is 27%. The dielectric constant of the benzoxazine resin at 1 GHz is 2.9, and the dielectric dissipation factor of the benzoxazine resin at 1 GHz is 0.0195.

Synthesis Example 2

The temperature controller, the heating mantle, the electric mixer, and the condenser are placed on the 1 liter four-necked glass reactor. 31 grams of the dicyclopentadiene phenol resin (including 0.18 moles of hydroxyl groups), 93.5 grams of the bisphenol A (including 0.82 moles of hydroxyl groups), 31.6 grams of the m-xylylenediamine (including 0.45 moles of amino groups), 66 grams of the 2,6-dimethylaniline (including 0.55 moles of amino groups), and 460 grams of the toluene (the solvent) are added into the four-necked glass reactor. The four-neck glass reactor is then heated to a temperature ranging from 60° C. to 100° C., so as to dissolve the reactant.

Next, 67.3 grams (2.1 moles) of the polyoxymethylene is added into the four-necked glass reactor, and the condensation polymerization reaction is carried out for 1 to 5 hours at a temperature ranging from 60° C. to 100° C. After the reaction is completed, the temperature is to be maintained within a range from 60° C. to 100° C. for 4 to 10 hours. Then, the temperature is raised to be within a range from 105° C. to 115° C., so as remove water produced from the reaction and a part of the solvent. In this way, the benzoxazine resin having a solid content of 64 wt % to 66 wt % can be obtained.

The weight-average molecular weight of the benzoxazine resin is measured to be 2344 g/mol by the gel permeation chromatograph, and the smallest molecular proportion is 21.9%. The dielectric constant of the benzoxazine resin at 1 GHz is 2.7, and the dielectric dissipation factor of the benzoxazine resin at 1 GHz is 0.0153.

Resin Composition

The benzoxazine resin of the present disclosure has good dielectric properties and heat resistance, and can thus be added into a resin composition for producing a high-frequency substrate. Moreover, the benzoxazine resin of the present disclosure can have a higher added amount in the resin composition.

In the present disclosure, based on a total weight of the resin composition being 100 phr, an amount of the benzoxazine resin can be greater than 25 phr, preferably greater than 30 phr, and more preferably greater than 35 phr.

The resin composition of the present disclosure includes the benzoxazine resin, an epoxy resin, and a bismaleimide resin. Based on the total weight of the resin composition being 100 phr, the amount of the benzoxazine resin ranges from 30 phr to 50 phr, an amount of the epoxy resin ranges from 5 phr to 15 phr, and an amount of the bismaleimide resin ranges from 40 phr to 60 phr.

The epoxy resin can include one or more types of epoxy resin. In an exemplary embodiment, the epoxy resin is a phenol-formaldehyde epoxy resin. Further, the epoxy resin includes two types of phenol-formaldehyde epoxy resin (e.g., a dicyclopentadiene-dimethyl phenol-formaldehyde epoxy resin or a dimethyl phenol-formaldehyde epoxy resin). In other words, the reactant for synthesizing the epoxy resin includes at least one of 2,6-dimethylphenol and dicyclopentadiene. However, the present disclosure is not limited thereto. In some embodiments, a weight-average molecular weight of the epoxy resin ranges from 500 g/mol to 3000 g/mol.

The bismaleimide resin can include one or more types of bismaleimide resin (e.g., a phenylmethane bismaleimide resin). However, the present disclosure is not limited thereto. In some embodiments, a weight-average molecular weight of the bismaleimide resin ranges from 350 g/mol to 750 g/mol.

Apart from the above-mentioned benzoxazine resin, epoxy resin, and bismaleimide resin, the resin composition can optionally further include a hardener, a flame retardant, a filler, a coupling agent, and an accelerator. For example, the hardener can be a phosphorus-containing phenol-formaldehyde resin hardener or a phenol-formaldehyde resin hardener. The flame retardant can be a phosphorus-based flame retardant. The filler can be silicon dioxide. The coupling agent can be a silane coupling agent. The accelerator can be 2-methylimidazole. However, the present disclosure is not limited thereto.

For better understanding of the present disclosure, resin compositions of Examples 1 and 2 and resin compositions of Comparative Examples 1 and 2 are provided herein and are used as materials for producing a copper foil substrate. Examples 1 and 2 are different from Comparative Examples 1 and 2 in that the compositions of Examples 1 and 2 include the benzoxazine resin of the present disclosure, while the compositions of Comparative Examples 1 and 2 include other benzoxazine resins on the market (e.g., 4,4'-methylenedianiline benzoxazine resin or dicyclopentadiene phenol benzoxazine resin). Furthermore, the composition of Example 1 includes the benzoxazine resin of Synthesis Example 1, and the composition of Example 2 includes the benzoxazine resin of Synthesis Example 2. Component ratios of the resin compositions of Examples 1 and 2 and Comparative Examples 1 and 2 are listed in Table 1. Unless indicated otherwise, the unit of each component in Table 1 is phr.

The copper foil substrate can be produced by steps as follows. Firstly, a glass fiber cloth is immersed into the resin composition, and is then dried and half-hardened to form a prepreg. A melt viscosity of the prepreg ranges from 4000 poise to 12000 poise. Next, four such prepregs are stacked in-between two copper foils of 35 μm, and the copper foil substrate is prepared through a hot-pressing process in which the temperature is increased in stages. During the hot-pressing process, the temperature is raised to 85° C., and the hot pressing is performed at a pressure of 7 kg/cm² for 0.5 hours. Then, the temperature is further raised to 195° C., and the hot pressing is performed at a pressure of 25 kg/cm² for 2 hours. In this way, the copper foil substrate is obtained.

After the copper foil substrate is produced, a glass transition temperature, a heat resistance, a water absorption rate, a dielectric constant, and a dielectric dissipation factor of the copper foil substrate are measured, and results thereof are shown in Table 1.

In Table 1, properties of the copper foil substrate are evaluated in the following manner.

(1) Glass transition temperature: A differential scanning calorimeter (DSC) is used to measure the glass transition temperature of the copper foil substrate at a heating rate of 20° C./min.

(2) Heat resistance: The copper foil substrate is cut into a square sample of 6.35 mm×6.35 mm, is baked at 105° C. for 2 hours, and is placed inside a thermal mechanical analyzer with the temperature being raised to 288° C. at a heating rate of 10° C./min and maintained at 288° C., so as to record the time taken to cause blistering and delamination of the sample.

(3) Water absorption rate: The copper foil substrate is cut into a square sample of 5 cm×5 cm, and is baked at 105° C. for 2 hours, so as to weigh an initial weight of the sample. Then, the sample is placed inside a pressure cooker at 120° C. under a pressure of 2 atm for 2 hours, and the weight of the sample is weighed again. The water absorption rate is obtained by dividing a weight difference of the sample before and after being in the pressure cooker by the initial weight of the sample.

(4) Dielectric constant (3 GHz): The copper foil substrate is cut into a square sample of 5 cm×5 cm, and is baked at 105° C. for 2 hours. A thickness of the sample is measured by a thickness gauge, and an impedance analyzer (Agilent E4991A) is then used to measure the dielectric constants of the sample at three locations, so as to obtain an average value thereof.

(5) Dielectric dissipation factor (3 GHz): The copper foil substrate is cut into a square sample of 5 cm×5 cm, and is baked at 105° C. for 2 hours. A thickness of the sample is measured by a thickness gauge, and an impedance analyzer (Agilent E4991A) is then used to measure the dielectric dissipation factors of the sample at three locations, so as to obtain an average value thereof.

TABLE 1

| | Example 1 | Example 2 | Comparative Example 1 | Comparative Example 2 |
|---|---|---|---|---|
| Components of Resin Compositions (unit: phr) | | | | |
| Dicyclopentadiene-dimethyl phenol-formaldehyde epoxy resin | 5 | 5 | 5 | 5 |
| Dimethyl phenol-formaldehyde epoxy resin | 5 | 5 | 5 | 5 |
| Bismaleimide resin | 50 | 50 | 50 | 50 |
| Benzoxazine resin of the present disclosure | 40 | 40 | — | — |
| 4,4'-methylenedianiline benzoxazine resin | — | — | 40 | — |
| Dicyclopentadiene phenol benzoxazine resin | — | — | — | 40 |
| Phosphorus-containing phenol-formaldehyde resin hardener | 10 | 10 | 10 | 10 |

TABLE 1-continued

|  | Example 1 | Example 2 | Comparative Example 1 | Comparative Example 2 |
|---|---|---|---|---|
| Phenol-formaldehyde resin hardener | 15 | 15 | 15 | 15 |
| Phosphorus-based flame retardant | 15 | 15 | 15 | 15 |
| Silicon dioxide | 60 | 60 | 60 | 60 |
| Silane coupling agent | 1 | 1 | 1 | 1 |
| 2-methylimidazole | 0.15 | 0.15 | 0.15 | 0.15 |
| Property Measurement of Copper Foil Substrate | | | | |
| Glass transition temperature (° C.) | 215 | 218 | 219 | 210 |
| Heat resistance (min) | >60 | >60 | >60 | >60 |
| Water absorption rate (—) | 0.47 | 0.47 | 0.48 | 0.49 |
| Dielectric constant (3 GHz) | 3.93 | 3.93 | 4.05 | 3.97 |
| Dielectric dissipation factor (3 GHz) | 0.00423 | 0.00418 | 0.00494 | 0.00489 |

According to the results of Table 1, the benzoxazine resin of the present disclosure can be used as the material of the copper foil substrate, and has properties of good heat resistance, low water absorption rate, low dielectric constant, and low dielectric dissipation factor. Compared with the benzoxazin resins currently on the market (e.g., 4,4'-methylenedianiline benzoxazine resin or dicyclopentadiene phenol benzoxazine resin), the benzoxazine resin of the present disclosure has a lower dielectric dissipation factor.

Specifically, the glass transition temperature of the copper foil substrate is greater than or equal to 210° C., and is preferably greater than or equal to 215° C. Accordingly, the copper foil substrate in the present disclosure has good heat resistance. The water absorption rate of the copper foil substrate is less than or equal to 0.50, and is preferably less than or equal to 0.48. The dielectric constant of the copper foil substrate is less than or equal to 4, and is preferably less than or equal to 3.95. In addition, the dielectric dissipation factor of the copper foil substrate is less than or equal to 0.005, is preferably less than or equal to 0.0045, and is more preferably less than or equal to 0.0043. Accordingly, the copper foil substrate in the present disclosure has good dielectric properties.

Beneficial Effects of the Embodiments

One of the beneficial effects of the present disclosure is that, by virtue of "the phenolic compound including a dicyclopentadiene phenol resin and bisphenol A" and "the primary amine compound including 2,6-dimethylaniline and m-xylylenediamine", the benzoxazine resin and the method for manufacturing the same, and the resin composition provided by the present disclosure have good heat resistance and dielectric properties.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A benzoxazine resin polymerized from a phenolic compound, a formaldehyde, and a primary amine compound by a condensation polymerization, wherein the phenolic compound includes a dicyclopentadiene phenol resin and bisphenol A, and the primary amine compound includes 2,6-dimethylaniline and m-xylylenediamine.

2. The benzoxazine resin according to claim 1, wherein a structural formula of the benzoxazine resin is:

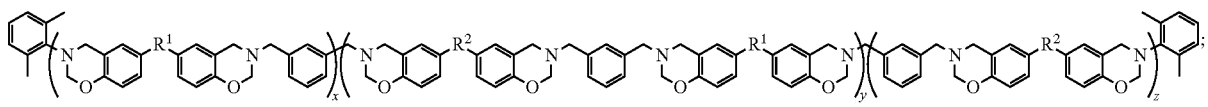

wherein an average value of each of x, y, and z ranges from 0 to less than 5, at least one of x and y is not 0, and at least one of y and z is not 0;

wherein $R^1$ is

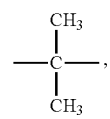

$R^2$ is

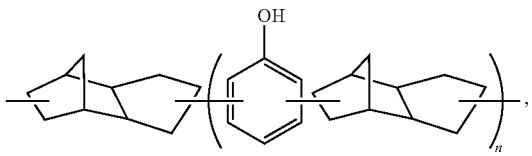

and n is an integer ranging from 0 to 5.

3. The benzoxazine resin according to claim 1, wherein a molar ratio of hydroxyl groups in the dicyclopentadiene phenol resin to hydroxyl groups in the bisphenol A ranges from 0.22 to 1.22.

4. The benzoxazine resin according to claim 1, wherein a molar ratio of amino groups in the 2,6-dimethylaniline to amino groups in the m-xylylenediamine ranges from 1 to 9.

5. The benzoxazine resin according to claim 1, wherein a molecular weight of the benzoxazine resin ranges from 750 g/mol to 2750 g/mol.

6. The benzoxazine resin according to claim 1, wherein a molar ratio of hydroxyl groups in the dicyclopentadiene phenol resin to total hydroxyl groups in the phenolic compound ranges from 18% to 55%.

7. The benzoxazine resin according to claim 1, wherein a molar ratio of hydroxyl groups in the bisphenol A to total hydroxyl groups in the phenolic compound ranges from. 45% to 82%.

8. The benzoxazine resin according to claim 1, wherein a molar ratio of amino groups in the 2,6-dimethylaniline to total amino groups in the primary amine compound ranges from 50% to 90%.

9. The benzoxazine resin according to claim 1, wherein a molar ratio of amino groups in the m-xylylenediamine to total amino groups in the primary amine compound ranges from 10% to 50%.

10. A resin composition, comprising: the benzoxazine resin as claimed in claim 1, an epoxy resin, and a bismaleimide resin; wherein, based on a total weight of the benzoxazine resin, the epoxy resin, and the bismaleimide resin being 100 phr, an amount of the benzoxazine resin ranges from 30 phr to 50 phr.

11. The resin composition according to claim 10, wherein, based on the total weight of the benzoxazine resin, the epoxy resin, and the bismaleimide resin being 100 phr, an amount of the epoxy resin ranges from 5 phr to 15 phr, and an amount of the bismaleimide resin ranges from 40 phr to 60 phr.

12. The resin composition according to claim 10, wherein the epoxy resin is a phenol-formaldehyde epoxy resin.

13. The resin composition according to claim 10, wherein a reactant for synthesizing the epoxy resin includes at least one of 2,6-dimethylphenol and dicyclopentadiene.

14. A method for manufacturing a benzoxazine resin, comprising:
mixing a phenolic compound, formaldehyde, a primary amine compound, and a solvent; and performing a condensation reaction at a temperature ranging from 60° C. to 100° C., so as to obtain the benzoxazine resin; wherein the phenolic compound includes dicyclopentadiene phenol and bisphenol A, and the primary amine compound includes 2,6-dimethylaniline and m-xylylenediamine.

15. The method according to claim 14, wherein a molecular weight of the benzoxazine resin ranges from 750 g/mol to 2750 g/mol.

16. The method according to claim 14, wherein a molar ratio of hydroxyl groups in the dicyclopentadiene phenol to total hydroxyl groups in the phenolic compound ranges from 18% to 55%.

17. The method according to claim 14, wherein a molar ratio hydroxyl groups in the bisphenol A to total hydroxyl groups in the phenolic compound ranges from 45% to 82%.

18. The method according to claim 14, wherein a molar ratio of amino groups in the 2,6-dimethylaniline to total amino groups in the primary amine compound ranges from 50% to 90%.

19. The method according to claim 14, wherein a molar ratio of amino groups in the m-xylylenediamine to total amino groups in the primary amine compound ranges from 10% to 50%.

\* \* \* \* \*